March 23, 1943.   F. SMITH   2,314,602
PARACHUTE HARNESS
Filed Dec. 8, 1939

INVENTOR
FLOYD SMITH
BY Albert Sperry
ATTORNEY

Patented Mar. 23, 1943

2,314,602

UNITED STATES PATENT OFFICE 2,314,602

PARACHUTE HARNESS

Floyd Smith, Manchester, Conn., assignor to Pioneer Parachute Company, Inc., Manchester, Conn., a corporation of Connecticut Application December 8, 1939, Serial No. 308,155

20 Claims. (Cl. 244—151)

My invention relates to parachute harness and similar constructions designed to be worn when using a parachute and particularly to harness of a novel type which are simple in construction, easily applied and readily released by the user on landing, and adapted to fit wearers of different size.

Most parachute harness used today have main lift webs or risers connected to the suspension lines of the parachute together with a seat or seat strap connected to the lift webs and upon which the user sits as the parachute descends. In order to hold the seat in place when the parachute is suddenly opened and the user swung about, harness members are connected to the lift webs and passed about the user's body. The harness must fit the user fairly well to prevent displacement thereof under the strains and conditions of use and in order to avoid any possibility of the user slipping out of the harness. For this reason it is necessary that the harness be adjustable to fit users who differ greatly in size.

While it is important that the harness fit properly it also is important that the wearer be able to release himself quickly from the parachute on landing so that he may not be smothered or drowned if a landing is made in water and so that he may not be dragged over the ground if a landing is made in a high wind. It is not always easy for the user to release himself from harness which fits properly particularly when, as has been true heretofore, all of the elements of the harness are permanently attached to each other and only the ends of straps are releasable. Numerous so-called "quick-release" types of harness have been designed for releasing the free ends of straps so that the user may free himself from the parachute. However, such devices have had locking or connecting members which are complicated in construction and include numerous springs or other elements which are uncertain in their operation and require repeated inspection and repair to insure proper operation thereof. It has not been possible heretofore for the user to disconnect a part of the harness from other elements thereof attached to the parachute so as to free himself from the parachute or to provide each user with a harness element to which he may become accustomed and which fits properly without adjustment. Furthermore parachute harness of the prior art have had straps which pass over the shoulders and about the body in such a way as to render it difficult to apply the harness particularly when the user is wearing a bulky flying suit.

In order to overcome these objections to constructions of the prior art I have developed a new type of parachute harness. A characteristic feature of my invention resides in the use of separate harness elements releasably connected together and including an element such as a seat strap, adapted to be connected to the lift webs or other elements of the harness in such a way as to permit ready release of the user from the parachute harness. This construction also renders it possible to provide each user with a seat strap of a different length for varying the effective length of the lift webs and the effective size of the harness without making any adjustments thereof.

Another characteristic feature of my invention resides in the use of harness members extending about the body with the ends thereof releasably connected to the lift webs to permit ready application of the harness and easy release therefrom. The harness and seat are constructed and arranged to hold the user securely in place on the seat without imposing strains upon the user's back and shoulders during the period of shock loading of the parachute when the canopy thereof opens and the descent of the parachute and its user is rapidly checked.

One of the objects of my invention is to provide a novel type of parachute harness which is simple in construction and easy to apply.

Another object of my invention is to provide a parachute harness which may be quickly and easily removed.

A further object of my invention is to provide parachute harness embodying separate harness elements releasably connected together.

Another object of my invention is to provide a novel type of connector for use with a parachute harness to releasably secure parts thereof together.

A specific object of my invention is to provide a parachute harness having lift webs with a seat that is detachably connected to the lift webs.

These and other objects and features of my invention will appear from the following description thereof in which reference is made to the figures of the accompanying drawing.

Figure 1:
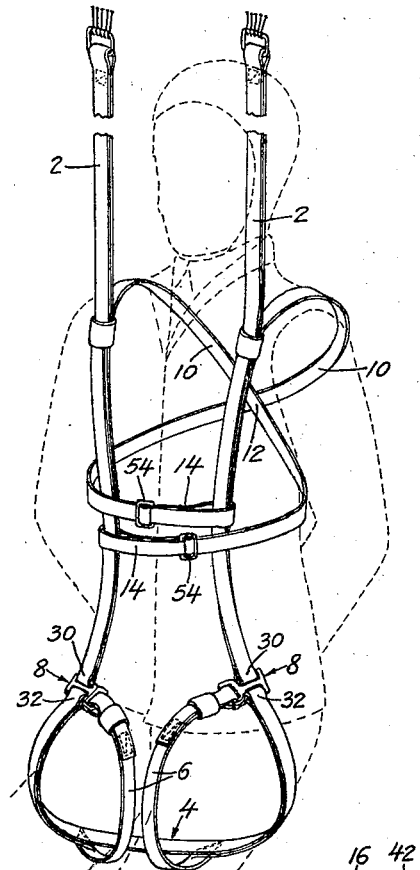
Fig. 1 is a perspective of a typical form of parachute harness embodying my invention, as arranged when in use.

In that form of my invention illustrated in the drawing the parachute harness embodies risers or lift webs 2 located on opposite sides of the harness and adapted to be attached to the suspension lines of a parachute. An element of the parachute harness and preferably the seat 4 thereof is formed separately from the lift webs and has the ends thereof releasably connected to the lift webs to support a user during descent of the parachute. Leg straps 6 are carried by the seat 4 and pass upward between the user's legs. The ends of the seat extend upward at the user's sides while the free ends of the leg straps extend upward in front of the user and the ends of both elements are connected to the lift webs by means of releasable connectors 8 so that the seat and leg straps may be readily disconnected from the remaining elements of the harness on landing and seats of different length or of different size may be attached to the lift webs and extend upward at the user's sides for different distances to vary the effective length of the lift webs and the size of the harness to fit any user without further adjustment of the harness.

In order to prevent the user from slipping off the seat each lift web has a body strap 10 attached thereto adjacent the user's shoulders and arranged to pass rearwardly over the shoulder and downward diagonally across the user's back so that the body straps cross at 12 near the middle of the back. The straps then pass on beneath the user's arms and back across the chest. The free end of each body strap is releasably connected to the lift web to which it is attached. Preferably the connection between the free ends of the body straps and the lift webs is effected by means of a loose loop 14 so that when the seat is disconnected from the lower ends of the lift webs any pull on the lift webs or body straps will cause the lift web to pull out of the loop 14 so that the ends of the body straps separate from the lift webs to free the user from the harness without further manipulation.

Figures 3, 4:
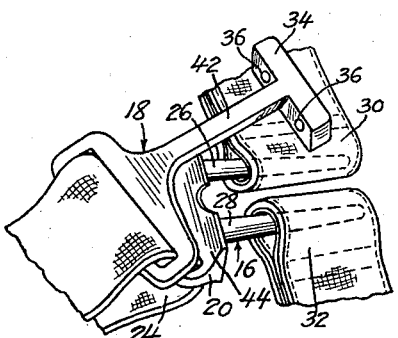
Fig. 3 is an enlarged perspective of the releasable connector illustrated in Fig. 1.
Fig. 4 is a perspective of the connector of Fig. 3 when released to permit separation of harness elements.

Any suitable type of connector may be used for connecting the ends of the seat and leg straps to the lift webs or for connecting other separable elements of the harness together, but I prefer to employ a quick releasing type of connector to permit ready separation of the harness elements. The connectors illustrated each include an attaching member 16 and a retaining member 18. The attaching member shown in Figs. 3 and 4 is formed with a base 20 having an opening 22 therein through which is passed a loose loop 24 on the end of the leg strap 6. The connector is thus carried by the leg strap but it will be evident that the connector may be carried by the lift web or seat if desired without altering the functional relation of the parts. Two spaced holding members in the form of tapered bars 26 and 28 are carried by the base of the attaching member and project therefrom. The bar 26 is designed to be slipped through a loop 30 on the lower end of the lift web while the bar 28 is designed to extend through a loop 32 on the end of the seat strap 4. With this construction the end of the seat and the end of the leg strap are connected to the lift web as long as the bars 26 and 28 are retained in the loops 30 and 32 on the ends of the lift web and seat respectively.

In order to retain these loops on the holding members or bars 26 and 28 a retaining member 18 is employed. As shown the retaining member is formed with a head 34 provided with recesses 36 into which the ends of the bars 26 and 28 extend. The head serves to support the ends of the bars and cooperates with the base of the attaching member to maintain them in predetermined spaced relation preventing bending or separation thereof when the connector and webbing of the lift webs and seat are subjected to the forces incident to shock loading on opening of the parachute canopy.

The retaining member 18 is formed with a base 38 having a slot 40 therein through which the loop 24 on the end of the leg strap passes while a bar 42 serves to connect the head 34 to the base.

When the parachute is in use and the weight of the user is applied to the seat 4 the head of the retaining member is held in engagement with the ends of the holding members or bars 26 and 28 and is prevented from being displaced by the clamping action of the loop 24 on the leg strap in urging the base 38 of the retaining member against the base 20 of the attaching member. In order further to prevent accidental displacement of the head of the retaining member the base 20 of the attaching member is offset and a shoulder 44 formed thereon. The base 38 of the retaining member is similarly offset to cooperate with the shoulder 44 in preventing movement of the head 34 and retaining member lengthwise of the holding members to disengage the ends thereof and permit separation of the lift webs and seat therefrom.

Figure 5:
Fig. 5 is a plan view of the detachable seat strap embodied in the harness of Fig. 1.

When the parachute is not in use and leg straps 6 are not under tension the retaining members may be held in place by suitable means for preventing separation of the opposite sides of the loop 24 or separation of the base of the attaching member and retaining member. For this purpose a loop of webbing or other material may be slidably carried by the leg strap and moved into position to prevent separation of the opposite sides of the loop 24 as shown at 46 in Fig. 5. In the alternative a pivoted clamping device 48 (Fig. 5) such as that commonly employed on aeroplane safety belts and elsewhere may be used to releasably clamp the opposite sides of the webbing and the bases of the attaching and retaining members together.

Harness embodying the present invention may be used with any suitable type of parachute pack and the pack may be attached to the elements of the harness in any convenient way. Thus a back pack may be stitched to or removably connected to the body straps 10 adjacent the users back or a seat pack may be stitched or otherwise connected to the seat 4 and other types of packs may be attached in any preferred manner to the parachute harness.

Figure 2:
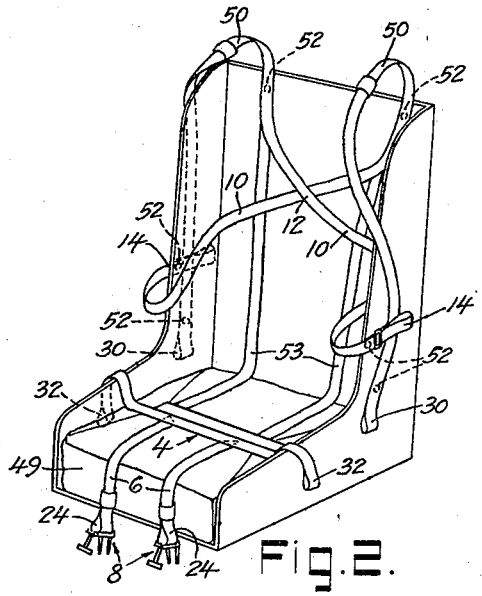
Fig. 2 is a perspective of the harness shown in Fig. 1 with the parts thereof released for application of the harness.

As shown in Fig. 2 the harness and parachute pack, shown as a seat pack 49, may be left in the seat of the aircraft and the portions 50 of the harness, comprising the lift webs 2 and the body straps 10, may be fastened by snap members 52 to the sides or back of the seat or elsewhere. The lift webs then may extend downward at the rear of the seat at 53 to the seat pack 49. It is therefore a very easy matter for the aviator who may be dressed in a bulky flying suit, to place a seat strap 4 of the desired size on the top of the pack 49 and to take his seat upon the seat strap with his back against the body straps 10. He then draws the portions 50 of the harness and the ends of the lift webs down over his shoulders releasing the snap fasteners and draws the free ends of the body straps inward across the chest and passes the ends of the lift webs through the loose loops 14 on the free ends of the body straps. The leg straps 6 and connectors 8 are then drawn upward between the user's legs and the loop 30 on the lower end of each lift web is slipped over the tapered holding member 26 of an attaching member of the connector while the loop 32 on the end of the seat strap is slipped over the other holding member 28. The head 34 of the retaining member is then applied so that the ends of the holding members 26 and 28 enter the recesses 36 in the head and the base 38 of the retaining member is clamped against the base 20 of the attaching member by means of the slidable loop 46 or the pivoted clamping device 48 to prevent separation of the retaining member and its head from the attaching member.

In this way the harness is applied without requiring the aviator to thread his arms through any loops and without rendering it necessary for him to wear the harness or parachute on leaving the aircraft.

In using the parachute the operator makes the usual jump and deploys the parachute by means of a rip cord or otherwise so that on opening of the canopy the user's weight is applied to the seat 4 and the leg straps 6. This serves to draw the loops 24 of the leg straps tightly about the bases of the attaching member and retaining member of each connector so that these members are securely held against displacement. At the same time the head 34 of the retaining member and the base 20 of the attaching member serve to support the ends of the holding members 26 and 28 to prevent bending or displacement thereof on shock loading of the parachute as the canopy opens. Thereafter during descent of the parachute the slidable loop 46 or the clamping device 48 may be moved to free the opposite sides of the loops 24 so that the clamping and retaining members may be easily separated when the leg straps are relieved of the user's weight. On landing the loop 24 is loosened and the operator grasps the head of the retaining member pushing with his thumb against the base of the attaching member to move the attaching member back away from the retaining member and free the ends of the holding members 26 and 28 from the recesses in the retaining member. The loop 30 on the end of the lift web and the loop 32 on the end of the seat are then free to slide off the tapered holding members to disconnect the seat from the lift webs and the remaining elements of the harness. The pull of the parachute on the lift webs then draws these webs through the loose loops 14 on the ends of the body straps so that the harness falls off the user without any further manipulations.

A particular advantage in the construction described resides in the ability to use seats and leg straps of different length to vary the effective length of the lift webs so that the harness may be worn by any user without making adjustments in the harness. Since most adjustments required to adapt parachute harness to users of different size arise from differences in the length of the wearer's body and differences in the length of leg straps or other elements passing about the thighs it is possible to make practically all of the adjustments necessary by using seat straps and leg straps of different length, which may be designated "large," "medium" and "small." However, if desired adjusting links 54 may be applied to the body straps or elsewhere to make further adjustments to insure comfort to the user.

The form and arrangement of the harness elements and connectors shown and described represent the best form thereof known to me at present but it is recognized that many other types of connectors may be designed and used in the construction and other types and arrangements of harness elements may be employed in the combination without departing from the spirit of my invention. It should therefore be understood that the embodiment of my invention shown in the drawing and described above is intended to be illustrative of my invention and is not intended to limit the scope thereof.

I claim:

1. Parachute harness comprising lift webs, a seat and connectors releasably connecting said seat to said lift webs, said connectors each having members one of which is engaged by a lift web and the other of which is engaged by said seat and means releasably retaining said lift webs and seat in engagement with said members.

2. Parachute harness comprising lift webs, a separable seat and means releasably connecting the seat to the lift webs, said means being carried by one of said elements and releasably engaging the other to permit separation of the seat from the lift webs on release of said means.

3. Parachute harness comprising lift webs, a seat separable from said lift webs, a connector having spaced holding members thereon, means on said lift webs engaging one of said holding members, means on said seat engaging another of said members and retaining means releasably engaging said holding members to prevent separation of said lift webs and seat from said holding members.

4. Parachute harness comprising lift webs, a seat and connectors detachably connecting said seat to said lift webs, said connector having spaced members one of which is engaged by said lift webs and the other of which is engaged by said seat and means at the opposite ends of said members to hold the same in predetermined spaced relation.

5. In a parachute harness, having lift webs on opposite sides thereof, a seat, means connecting the ends of the lift webs to the seat, the combination of means for holding a user on said seat comprising a pair of straps one of which is attached to each lift web and extends therefrom across the user's back, beneath the opposite arm and across the chest, and a slip connection between the free end of each strap and the lift web to which it is attached whereby release of the ends of the lift webs from the seat permits said straps to slip from the user.

6. In a parachute harness having lift webs on opposite sides thereof and a seat connected thereto, means for holding a user on said seat comprising a pair of straps one of which is attached to each lift web and extends therefrom rearwardly over the user's shoulder and across the user's back, passing beneath the opposite arm and across the chest, means on each strap releasably connecting the free end thereof to the lift web to which the strap is attached and means connected to said seat and lift webs controlling release of the free ends of said straps from said lift webs.

7. In a parachute harness having a pair of lift webs with a seat connected thereto, means for holding a user on said seat comprising a pair of straps one of which is attached to each lift web and extends therefrom across the back beneath the opposite arm and across the chest, and a loop of material formed on the free end of each strap and loosely encircling the lift web to which the strap is attached.

8. Parachute harness comprising lift webs, body straps attached to said lift webs and arranged to pass about a user's body and having free ends loosely engaging the lift webs, a seat separate from said lift webs and means releasably connecting said seat to said lift webs below the loose connection of the body straps thereto whereby on release of said means said seat is separable from said lift webs to permit ready separation of the free ends of said body straps from said lift webs.

9. In a parachute harness having a pair of lift webs with a seat connected thereto, means for holding a user on said seat comprising a pair of straps one of which is attached to each lift web and extends therefrom across the back beneath the opposite arm and across the user's chest and means for releasing a user from said harness comprising a releasable connection between said seat and lift webs.

10. In a parachute harness adapted to be worn by users of different size, means for fitting said harness to said users comprising a series of flexible seat straps of different lengths, separable from other elements of said harness and each having means for detachably connecting the same to other elements of the harness.

11. In combination with a parachute harness having lift webs and adapted to be worn by users of different size, means for varying the effective length of the harness to fit said users comprising a series of alternative seat straps of different length each having means adjacent opposite ends thereof for detachably connecting the same to said lift webs.

12. A parachute harness having two lift webs, a seat construction wholly disconnected from the lift webs and embodying straps which extend upward outside the user's legs and other straps which extend upward between the user's legs and means detachably connecting one of the former straps and one of the latter straps of the seat construction to each of the lift webs.

13. In a parachute harness having lift webs, means for adapting the harness for use by wearers of different size comprising a seat strap completely detachable from the lift webs and of a length determined by the size of the wearer, said seat strap being arranged to extend beneath the wearer's seat and terminating in ends which extend upward at the outer sides of the wearer's legs for attachment to the ends of lift webs, whereby the length of the seat strap controls the position of the ends thereof with respect to the wearer and the position of the wearer with respect to the ends of the lift webs, and releasable means for connecting the ends of the seat strap to the ends of the lift webs.

14. In a parachute harness having lift webs, means for adapting the harness for use by wearers of different size comprising a seat strap completely detachable from the lift webs and of a length determined by the size of the wearer, said seat strap being arranged to extend beneath the wearer's seat and terminating in ends which extend upward at the outer sides of the wearer's legs for attachment to the ends of lift webs, whereby the length of the seat strap controls the position of the ends thereof with respect to the wearer and the position of the wearer with respect to the ends of the lift webs, and releasable means carried by the seat for connecting the ends of the seat strap to the lift webs.

15. In a parachute harness having lift webs, means for adapting said harness for use by wearers of different size comprising, a seat which is completely separable from the lift webs and includes a seat strap the length of which is determined by the size of the wearer, said seat strap being formed to extend beneath the wearer's seat and terminating in ends which extend upward at the outer sides of the wearer's legs, leg straps connected to the seat strap between the ends thereof and arranged to extend forward and upward between the wearer's legs, and means carried by the leg straps for connecting the ends of the seat strap to the lift webs.

16. In a parachute harness having lift webs at opposite sides of the harness the combination of a seat adapted to be completely detached from the lift webs and embodying a seat strap formed to extend beneath the user's seat and terminating in ends which extend upward at the outer sides of the user's legs, leg straps attached to the seat strap between the ends thereof and arranged to extend forward and upward from the seat strap between the user's legs, and releasable means for connecting one end of the seat strap and one of said leg straps to each lift web.

17. In a parachute harness having lift webs on opposite sides thereof, a seat extending between said lift webs, releasable means connecting the opposite ends of said seat to said lift webs, and means for holding a user on said seat comprising webbing having portions loosely engaging the lift webs and retained in engagement therewith by the releasable connecting means for the seat.

18. A parachute harness having lift webs, a seat, webbing arranged to pass about the user's body to hold the user on said seat, said webbing having portions thereof loosely engaging the lift webs near the ends of said webs, and means for retaining the lift webs and said portions of the webbing in engaged relation including elements detachably connecting the seat to the ends of the lift webs.

19. In a parachute harness having lift webs, a seat, means detachably connecting said seat to the ends of the lift webs, and means for holding a user on said seat comprising webbing having portions provided with loops through which the ends of the lift webs extend, whereby release of the seat from the ends of the lift webs permits said ends to slip from the loops in the webbing and release the user.

20. A parachute harness comprising lift webs, body straps each having one portion thereof fixedly secured to a lift web at a point spaced from the end of the lift web and each having a free end loosely engaging a lift web near the end of the lift web, a seat, and means releasably securing the seat to the ends of the lift webs whereby release of the seat from the lift webs serves to permit the free ends of said body straps to become disengaged from the lift webs.

FLOYD SMITH.